United States Patent
Kokkinen et al.

(10) Patent No.: US 8,681,753 B2
(45) Date of Patent: Mar. 25, 2014

(54) METHOD, SYSTEM AND ARRANGEMENTS FOR SETTING UP AND MAINTAINING A WLAN CONNECTION WITHIN PREDICTABLY MOVING VEHICLES

(75) Inventors: Heikki Kokkinen, Helsinki (FI); Harald Kaaja, Helsinki (FI); Kari O. Koivisto, Espoo (FI); Mika Kuoppala, Espoo (FI); Marko Karhiniemi, Espoo (FI)

(73) Assignee: Nokia Corporation, Espoo (FI)

( * ) Notice: Subject to any disclaimer, the term of this patent is extended or adjusted under 35 U.S.C. 154(b) by 696 days.

(21) Appl. No.: 12/085,750

(22) PCT Filed: Nov. 29, 2006

(86) PCT No.: PCT/FI2006/000396
§ 371 (c)(1),
(2), (4) Date: May 7, 2009

(87) PCT Pub. No.: WO2007/063168
PCT Pub. Date: Jun. 7, 2007

(65) Prior Publication Data
US 2009/0219900 A1    Sep. 3, 2009

(30) Foreign Application Priority Data
Nov. 29, 2005   (FI) .................................. 20051216

(51) Int. Cl.
*H04W 4/00*    (2009.01)
(52) U.S. Cl.
USPC ......................... 370/338; 370/331; 370/328
(58) Field of Classification Search
USPC ....................................................... 370/338
See application file for complete search history.

(56) References Cited

U.S. PATENT DOCUMENTS

| 2002/0093982 A1* | 7/2002 | Joy et al. ....................... 370/468 |
| 2002/0122408 A1 | 9/2002 | Mullins |

(Continued)

FOREIGN PATENT DOCUMENTS

| CA | 2299778 A1 | 8/2000 |
| EP | 1598255 A1 | 11/2005 |

(Continued)

OTHER PUBLICATIONS

Korean Office Action issued Nov. 30, 2009 in parallel Korean Patent Application No. 10-2008-7012836 (4 pages) and English translation thereof (3 pages).

(Continued)

*Primary Examiner* — Shripal Khajuria
(74) *Attorney, Agent, or Firm* — Harrington & Smith

(57) ABSTRACT

Setting up and maintaining wireless communication connections with end user's terminals (301) on board a predictably moving vehicle (303) is shown with mechanisms for correcting for Doppler effects. A central device (302) within the vehicle (303) acts as a hub of a wireless network. There are a number of fixed transceivers (304). A connection arrangement (305, 306, 705, 706, 1001, 1101, 1122) connects the fixed transceivers (304) to an external packet-switched data network. The central device (302) within the vehicle (303) is a mobile router (302) equipped with routing capability (407). The connection arrangement (305, 306, 705, 706, 1001, 1101, 1122) includes a connection (705, 706, 1001) between a number of fixed transceivers (304) and a fixed central device (305) The fixed central device (305) has routing capability (1007), and together with the mobile router (302) implement routing of packets between the packet-switched network and an end user's terminal (301).

10 Claims, 11 Drawing Sheets

(56) References Cited

U.S. PATENT DOCUMENTS

| | | |
|---|---|---|
| 2003/0235165 A1 | 12/2003 | Wang |
| 2004/0218632 A1* | 11/2004 | Kang ........................... 370/474 |
| 2004/0248519 A1 | 12/2004 | Niemela |
| 2005/0128969 A1 | 6/2005 | Lee et al. |
| 2005/0197748 A1 | 9/2005 | Holst et al. |
| 2005/0259598 A1 | 11/2005 | Griffin et al. |
| 2005/0259619 A1 | 11/2005 | Boettle et al. |

FOREIGN PATENT DOCUMENTS

| | | |
|---|---|---|
| JP | 9084126 | 3/1997 |
| JP | 2003-309517 | 10/2003 |
| JP | 2006157117 A | 6/2006 |
| WO | 03/032503 | 4/2003 |
| WO | 03/096623 | 11/2003 |

OTHER PUBLICATIONS

Patent Abstracts of Japan, Publication No. 09-084126, published Mar. 28, 1997, 1 page.

Chinese Office Action for corresponding Chinese patent application No. 200680044437.9 dated May 8, 2009 (7 pages), and English language translation thereof (9 pages), 16 pages total.

English language translation of Abstract for JP2003309517 published Oct. 31, 2003 (1 page).

* cited by examiner

METHOD, SYSTEM AND ARRANGEMENTS FOR SETTING UP AND MAINTAINING A WLAN CONNECTION WITHIN PREDICTABLY MOVING VEHICLES

BACKGROUND

The invention concerns generally the technology of setting up and maintaining wireless connections to terminals that are collectively moving on board a carrier vehicle. Especially the invention concerns the technology of providing WLAN connections to trains and other railway vehicles.

WLAN or Wireless Local Area Network is a general designation for all technologies that enable computers or computer-like terminals to exchange digital data wirelessly with multiple other similar devices nearby. At the original date of writing this description the data rates in WLAN connections are of the order of 11 Mbit/s. According to an established presumption, a WLAN must also have a connection to an external, widely spread public network, preferably the Internet, so that a terminal of a WLAN has practically unlimited access to all over the world.

A WLAN connection is believed to become an essential part of everyday life in a very wide scope of environments. An ongoing developmental trend is the increasing appearance of so-called WLAN hotspots at locations where a number of people may have the need and opportunity to use their terminals for accessing a network simultaneously. An interesting special case of such locations consists of public transport vehicles, such as buses, trains and aeroplanes. Since the range between a terminal and a base station in a typical WLAN connection is of the order of the dimensions of e.g. a railway carriage, an obvious suggestion for equipping a train with WLAN connections is to install a base station within the carriage for setting up the actual WLAN and to arrange for a separate centralised radio link between that base station and the stationary outside world.

FIG. 1 illustrates a basic case where a general-purpose cellular radio system comprises a number of fixed base stations 101 to 110, each having a coverage area or cell so that schematically the cells cover a certain geographical area as a hexagonal grid. A railway track 111 crosses through said area, and thus cuts through a number of said cells. At one location the railway track 111 passes through a tunnel 112. The most straightforward alternative for setting up a radio link between a WLAN base station 113 in a railway carriage and the stationary outside world would be to equip the WLAN base station 113 with a terminal transceiver of the general-purpose cellular radio system, and to treat the moving WLAN as if it was a single moving terminal. Numerous drawbacks make such a solution not feasible. Among these are the typically insufficient bandwidth available for terminals in the general-purpose cellular radio system, uncertainty of coverage in difficult locations like the tunnel 112, and unguaranteed capacity in situations where one of the cells may already have an excessive number of ordinary terminals with active communication connections.

FIG. 2 illustrates a more advanced solution in which one takes advantage of the fact that unlike the terminals of a general-purpose cellular radio system, a train will not appear in arbitrary geographical locations, but will only move along a very well defined path. In FIG. 2 the path of the railway track 111 is covered by a number of dedicated cells 201 to 209, including a specific cell 210 in the tunnel 112 that utilises e.g. the known so-called leaking cable technique. In this solution at least the capacity issues can be solved more easily than in the solution of FIG. 1, because there are no other terminals competing with the moving WLAN base station 113 that appears as a moving terminal in the system consisting of the cells 201 to 210. However, there remain important questions to be solved. In order to cover significant portions of a railway network with dedicated cells, there are easily needed several hundreds or thousands of fixed base stations. How could these be connected to a core network operative on the background in a cost-effective way, and how to effectively manage the mobility of the end users' terminals?

Additionally there are serious questions related to Doppler shift and fading. A digital radio transmission of the kind used in the connections between the moving WLAN and the fixed base stations involves transmitting packets, each of which comprises a so-called training sequence. A receiver uses the known form of the training sequence to calculate a channel estimate, which acts as control information to a matched filter that tries to counteract the detrimental effects of nonlinearities in the radio channel. Updated channel estimates are only available as frequently as new packets come in. If packets are very long, the time interval between the calculation of consecutive channel estimates becomes long, which increases the risk that the actual impulse response of the channel changes too much from the most recently calculated channel estimate, causing a packet to be lost. On the other hand, if packets are very short they enable frequent updating of the channel estimate, but the relative amount of transmission capacity available for payload data gets smaller.

Advantages may be gained from the present invention by providing solutions for setting up and maintaining WLAN connections within predictably moving vehicles.

Another way of gaining advantages from the invention is by providing a cost-effective way of connecting dedicated, fixed base stations with a core network as a part of such a solution. Another way of gaining advantages from the invention is by providing a method and appropriate hardware for managing the mobility of end users' terminals that move within a predictably moving vehicle. Another way of gaining advantages from the invention is by providing radio interface mechanisms between fixed base stations of said kind and a WLAN part moving within a predictably moving vehicle.

One way of gaining advantages from the invention is by building an infrastructure comprising a chain of dedicated access points, by properly linking the access points to each other and to inner network structures, and by setting up a mobility management scheme that takes advantage of predictability of the movement of a vehicle.

SUMMARY

According to one aspect of the invention, a communication system comprises:
- a central device within a vehicle, adapted to act as a hub of a wireless network on board the vehicle,
- a number of fixed transceivers, each of which has a geographical coverage area that constitutes a cell, and
- a connection arrangement connecting the fixed transceivers to an external packet-switched data network;

of which the central device within the vehicle is adapted to communicate with a fixed transceiver in the cell of which the central device within the vehicle resides.

It is characterised in that:
- the central device within the vehicle is a mobile router equipped with routing capability,
- the connection arrangement comprises an optical connection between a number of fixed transceivers and a fixed central device, which optical connection goes through an optical fibre or a small number of optical fibres taken from a long-distance optical cable running along a predicted route of movement of the vehicle, said fixed central device is equipped with routing capability, and said fixed central device together with said mobile router are adapted to implement routing of data packets between the packet-switched data network and an end user's terminal operative in the wireless network on board the vehicle.

Another aspect of the invention concerns an electronic content distribution system for installation on board of a vehicle, comprising:

a central device to be installed on board the vehicle, and a receiver coupled to said central device and adapted to wirelessly receive remotely produced content from a network external to the vehicle.

The electronic content distribution system is characterised in that it comprises:

router means within the central device, said router means being adapted to make the central device a router of a wireless network on board the vehicle, a connection from the central device to audiovisual distribution means inside the vehicle;

wherein said central device is adapted to deliver received remotely produced content both to wireless end user's devices operating in the wireless network on board the vehicle and to said audiovisual distribution means inside the vehicle.

Another aspect of the invention concerns a method for setting up and maintaining wireless communication connections with end user's terminals on board a predictably moving vehicle. The method comprises the steps of:

establishing a wireless network around a central device on board the vehicle, setting up a communication connection between the central device and one of a number of fixed transceivers, each of which has a geographical coverage area that constitutes a cell, and transferring data packets through the fixed transceiver between the central device on board the vehicle and an external packet-switched data network.

The method is characterised in that it comprises the steps of:

utilizing an optical connection between a number of fixed transceivers and a fixed central device for transferring data packets, which optical connection goes through an optical fibre or a small number of optical fibres taken from a long-distance optical cable running along a predicted route of movement of the vehicle, and maintaining routing tables at both said fixed central device and at a mobile router functionality of the central device on board the vehicle, in order to route data packets between the packet-switched data network and an end user's terminal operative in the wireless network on board the vehicle.

We may consider a communication system, where the predictable path of a moving vehicle is covered with the cells of wireless access points that have directional antennas, so that each cell is elongated in the direction of the vehicle's path of movement. The wireless access points are most advantageously coupled to each other with an optical fibre or a small number of optical fibres, which constitute a small part of a long-distance optical cable. Together with controller level management entities the access points constitute a closed network, in which the movement of end users' terminals appears as the collective movement of a vehicle carrying said end users' terminals. Mobility of said terminals can be managed by managing the mobility of the vehicle, which process can draw great advantage of the fact that all appropriate parts of the closed network can be pre-configured on the basis of predictable information about the movements of the vehicle.

We may also consider a proper infrastructure for the inside of the predictably moving vehicle mentioned above. A mobile router acts as a wireless hub for end users' terminals, as well as a linking node for receiving and distributing content in real time from external networks.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

Figure 1:
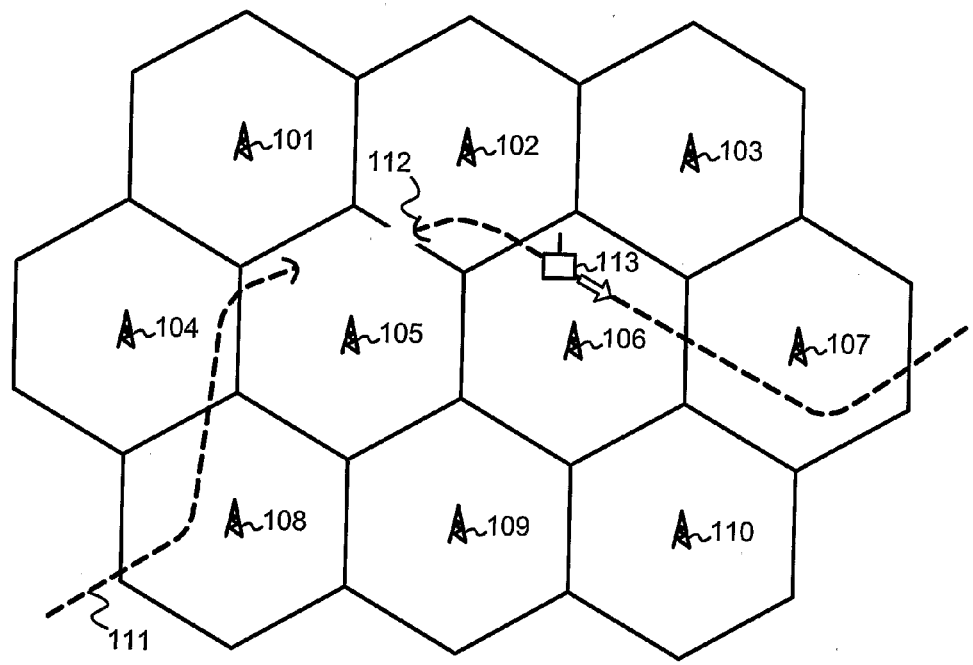
FIG. 1 illustrates a prior art communications network.
Figure 2:
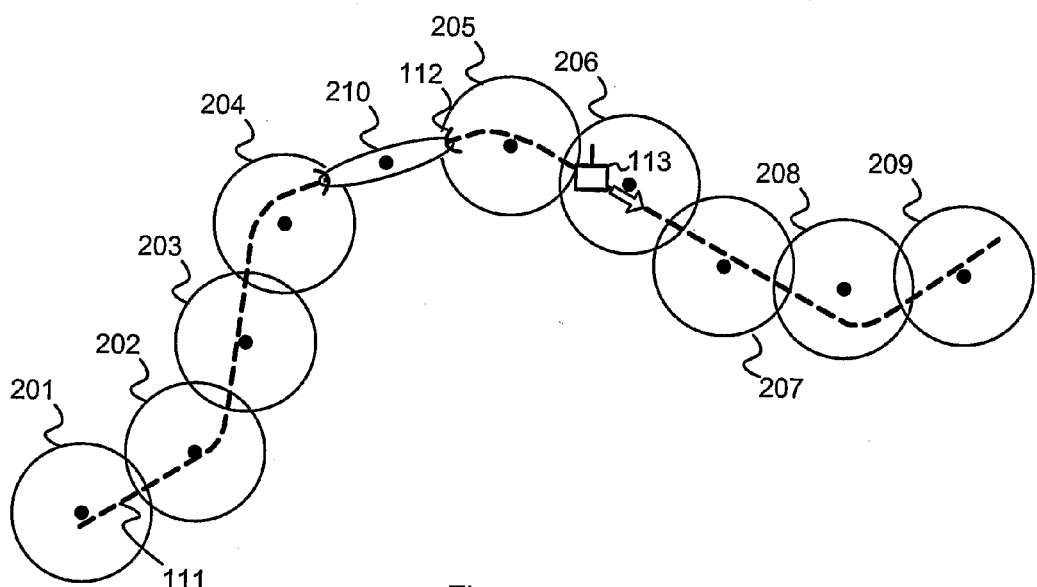
FIG. 2 illustrates another prior art communications network.
Figure 3:
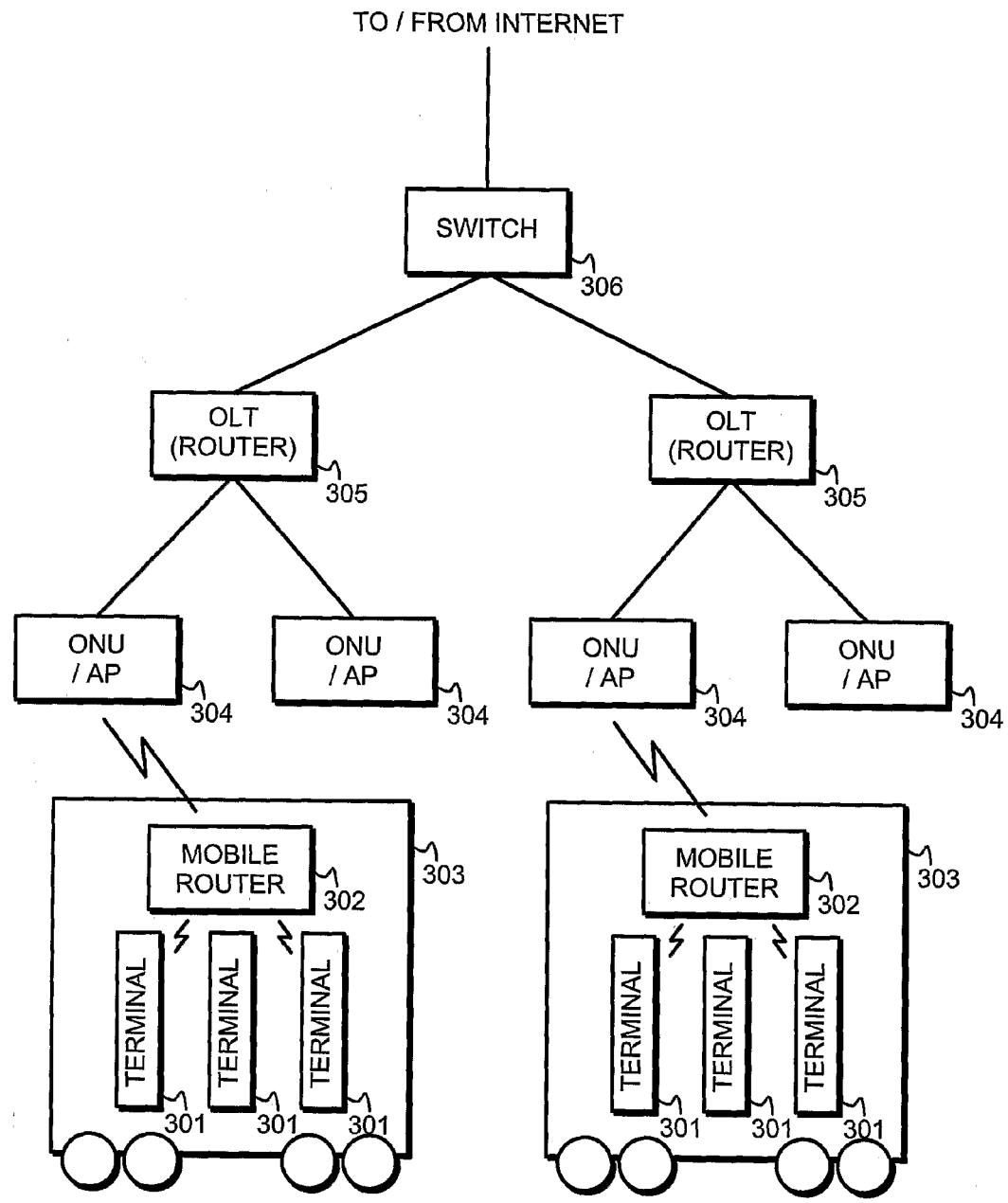
FIG. 3 illustrates the hierarchy of network elements in a communications system according to an embodiment of the invention.

FIG. 3 is a system level diagram of a wireless local area network solution according to an embodiment of the invention. A number of end users' terminals 301 are adapted to communicate wirelessly with a device known as the mobile router 302 within a vehicle 303. According to a most general characterisation the vehicle 303 is a vehicle moving in a predictable way, so that at least the geographical path of movement can be accurately predicted. As a very illustrative example the vehicle 303 can be thought to be a railway carriage. Along the predicted track of movement of the vehicle 303 there are a number of consecutive fixed base stations, designated here as Optical Network Units and Access Points (ONU/APs) 304. A mobile router 302 is adapted to have a wireless connection with at least one ONU/AP 304 at a time. A number of ONU/APs are connected to a router known as the Optical Line Termination (OLT) 305. A number of OLTs 305 are in turn connected to a switch 306, from which there is a connection to the Internet. In the following we discuss parts of the system in more detail, from bottom to top in FIG. 3.

Figure 4:
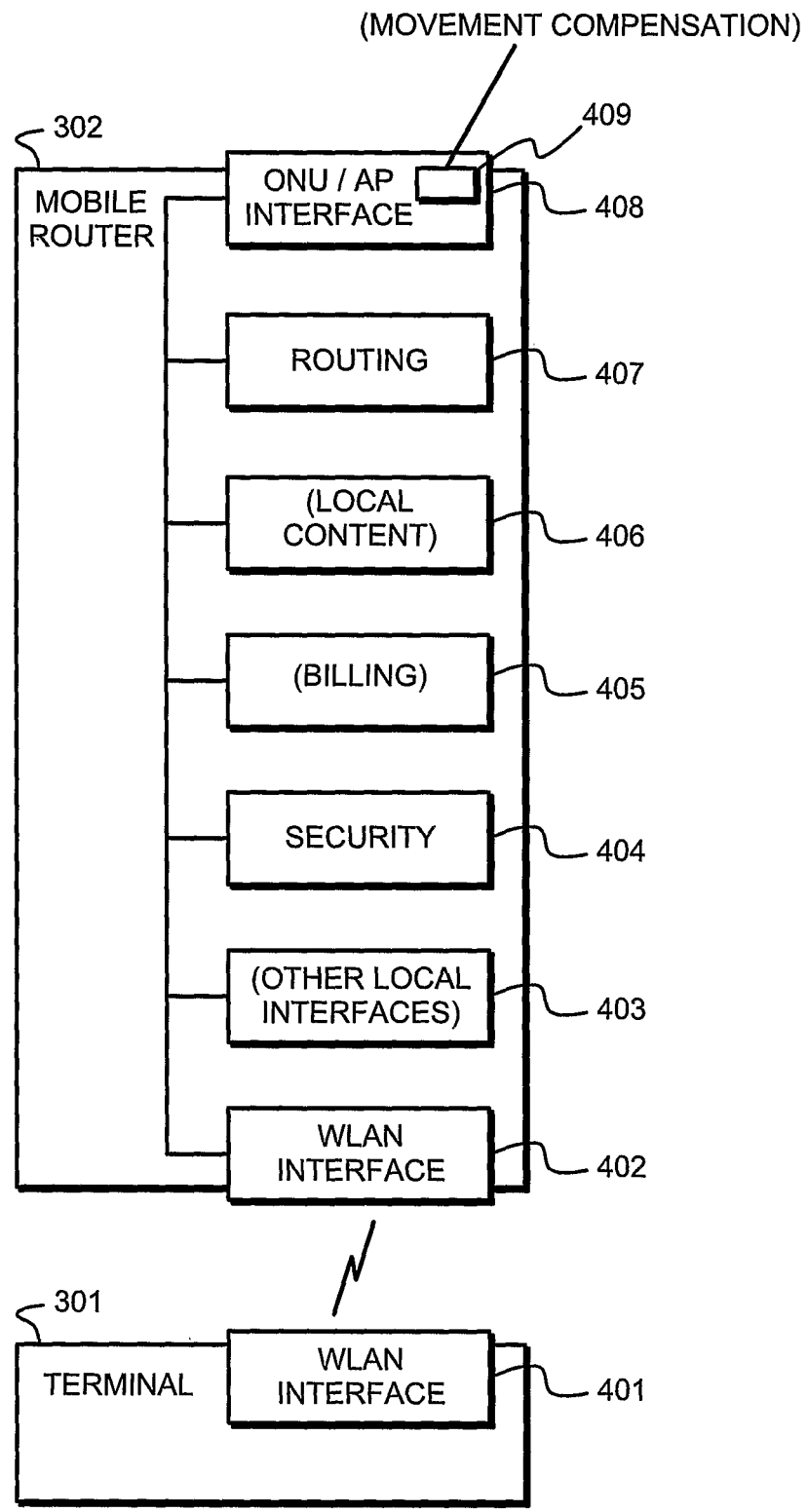
FIG. 4 illustrates schematically an end user's terminal and a mobile router in a communications system according to an embodiment of the invention.

FIG. 4 illustrates schematically certain functionalities of an end user's terminal 301 and a mobile router 302. The invention places few requirements to the end user's terminal, apart from including a WLAN interface 401. Considering the known technology at the time of writing this description, the end user's terminal 301 is typically a laptop computer, although it could as well be a personal digital assistant (PDA), a mobile telephone equipped for data network operation, or the like. For the purposes of the present invention, the main task of the mobile router 302 is to serve as the immediate access point for end users' terminals and as a continuously active node of the ad-hoc type wireless network to be established within a vehicle. For this purpose it comprises a WLAN interface 402 with a capacity high enough to serve a reasonably expectable number of end users in the terminal. The mobile router 302 may contain also other kinds of local interfaces 403. These may include e.g. a cable interface for end users' terminals that are only capable of connecting to a network via a cable, a content server interface for coupling the mobile router 302 to a local content server, a positioning interface for coupling the mobile router 302 to a positioning device such as a GPS receiver or some vehicle-specific navigation system, and/or a telemetry interface for coupling the mobile router to a system that obtains and maintains information about the condition and operation of the vehicle.

The mobile router 302 is—as the immediate wireless access point for end users' terminals—responsible for user authentication as well as providing confidentiality to the communication connections through encryption and other appropriate measures. These functionalities reside in a security module 404. If using the vehicle LAN is subject to charge, the mobile router 302 may also contain a billing module 405 for generating and maintaining billing information as well as forwarding such information to invoicing functionalities somewhere else in the network. If electronic money is used for paying for the connection, the billing module 405 may even be adapted for direct invoicing. The mobile router may simultaneously act as a local content server, offering e.g. entertainment such as music, video and games, for which purpose it may contain a local content module 406. As already suggested by its name, the mobile router must have a router module 407. The tasks and operation of the router module 407 are described in more detail later. Yet another interface 408 is present for setting up and maintaining the wireless interface towards ONU/APs. This interface may comprise a movement compensation part 409, which is described in more detail later.

Figure 5:
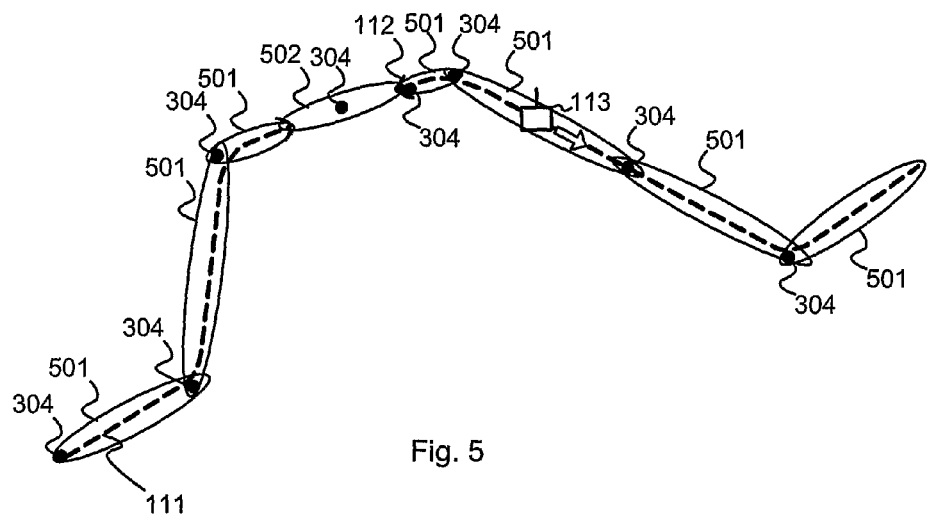
FIG. 5 illustrates an arrangement of cells in a communications system according to an embodiment of the invention.

The connections between mobile routers and ONU/APs are radio connections at frequencies of several GHz or tens of GHz. The predictability of movement of the vehicle is most advantageously utilized by placing the ONU/APs along the predicted path of movement and equipping them with directional antennas, the primary radiation lobes of which coincide with the direction of the path of movement. FIG. 5 illustrates how the path of a railway track 111 is covered with consecutive cells 501, each of which consists of the coverage area of an ONU/AP 304 a directional antenna of which points into the direction of the railway track 111. In FIG. 5 we have assumed that each ONU/AP has one directional antenna that has one primary radiation lobe, with the exception of the ONU/AP of the tunnel 112; according to a known practice, it utilises a leaking cable antenna that causes the tunnel cell 502 to cover the whole tunnel 112 irrespective of directions. A mobile router 113 moving along the railway track 111 is always within the cell of at least one ONU/AP 304. On straight segments of the track the dimension of a cell in the direction of the track is only limited by the useful range of radio waves. Long straight segments of the track may require placing several ONU/APs sequentially. Curved segments of the track require placing the ONU/APs closer to each other, since the track curves out of the highly directional radiation lobe relatively quickly.

Using directional antennas both at the ONU/APs and at the mobile routers enable utilizing antenna gain to compensate for effects detrimental to connection quality, especially spatial attenuation. The directional antennas may have a fixed directional structure, in which case the primary radiation lobe always points into the same direction, or they may be electronically steerable. The last-mentioned alternative is especially advantageous when a mobile router moves along a curved path with respect to a certain ONU/AP. Placing the ONU/APs as close as possible to the railway track or other predictable path of movement, and pointing the directional antennas along the path involve the advantage of limiting the range of variation in Doppler shift and other velocity-dependent factors.

A typical distance between ONU/APs, i.e. the dimension of a typical cell in the direction of the predicted path of movement, is estimated to be of the order of one kilometer.

Figure 6A:
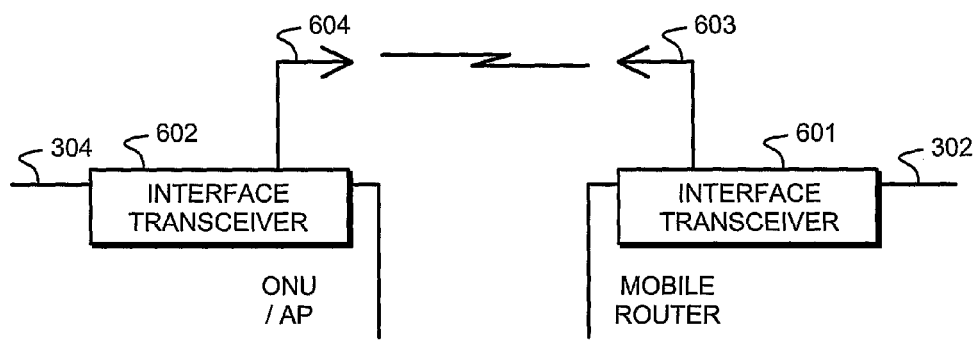
FIGS. 6a, 6b and 6c illustrate schematically alternatives for building an interface in a communications system according to an embodiment of the invention.
Figure 6B:
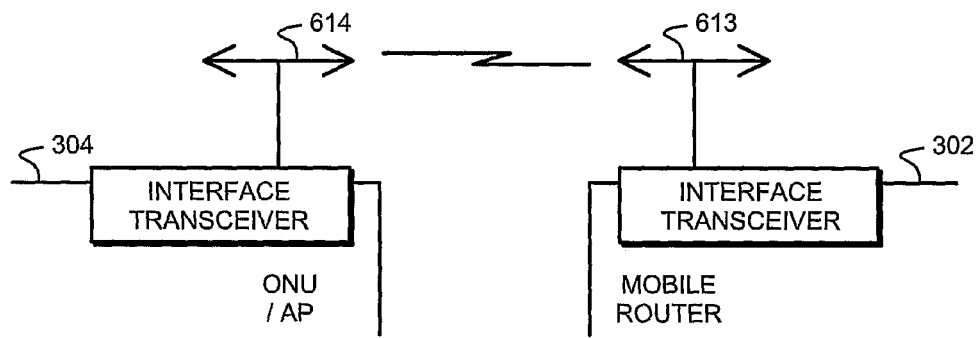
Figure 6C:
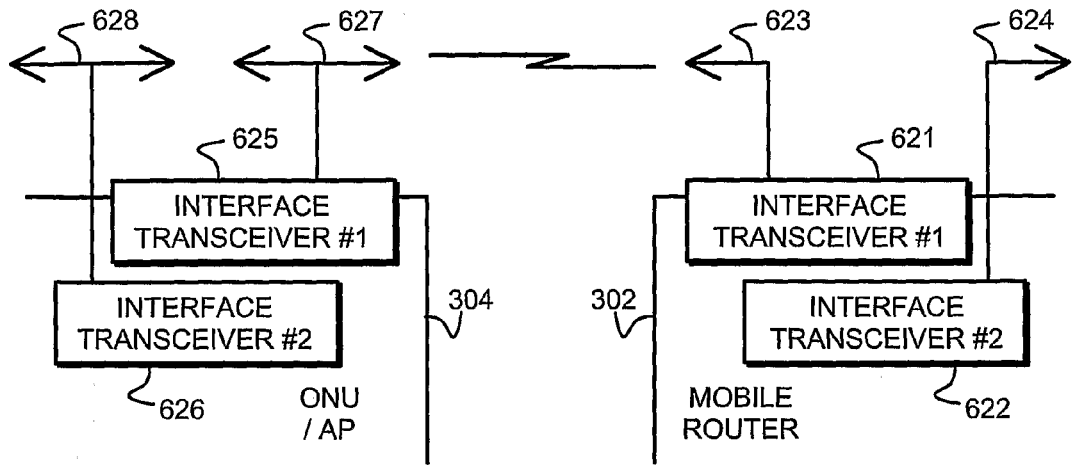

FIGS. 6a, 6b and 6c illustrate certain variations of using antennas and transceivers in the mobile router 302 and the ONU/AP 304. FIG. 6a is the basic case in which there is exactly one interface transceiver 601 and 602 in the mobile router 302 and the ONU/AP 304 respectively, and each of these has a fixed directional antenna 603 and 604 respectively. The antennas are facing each other. This solution has the drawback of requiring that it is ensured that e.g. a railway carriage in which the moving antenna 603 is located will not be turned the other way round with respect to the pointing direction of the antennas of the ONU/APs, which is a reasonable assumption in most cases. In order to completely avoid such a risk, at least one of the mobile router 302 and the ONU/AP 304 should be equipped with a symmetrically directional antenna that has two primary radiation lobes pointing into opposite directions. FIG. 6b goes as far as illustrating the use of such a symmetrically directional antenna 613 and 614 at both the mobile router 302 and the ONU/AP 304. Using a symmetrically directional antenna at an ONU/AP will naturally cause the cell of such an ONU/AP to appear symmetrically around the ONU/AP in the direction determined by the radiation lobes.

The cells of consecutive ONU/APs will have a certain geographical overlap, which requires separating their transmissions from each other. If code division multiple access is used, using different spreading codes at different ONU/APs is sufficient. In other cases it may be necessary to use different transmission frequencies, or suitable time synchronisation. In any case the requirement for smooth handovers between cells may require parallel interface transceivers in at least one of the mobile router 302 and the ONU/AP. In the mobile router, one of such parallel transceivers could be still communicating with the "old" ONU/AP while another is already setting up a connection with a "new" ONU/AP. Parallel interface transceivers may also be used for providing redundancy at the radio interface between the mobile router 302 and the ONU/AP 304. FIG. 6c illustrates an exemplary case in which the mobile router 302 includes two parallel interface transceivers 621 and 622. Each of these has a directional antenna 623 and 624 respectively pointing into one direction, so that the two antennas point into opposite directions. In the ONU/AP 304 there are also two parallel interface transceivers 625 and 626. Each of these has a directional antenna 627 and 628 pointing into two directions. Many permutations between numbers of interface transceivers, numbers of antennas and numbers of pointing directions of antennas are possible.

Figure 7:
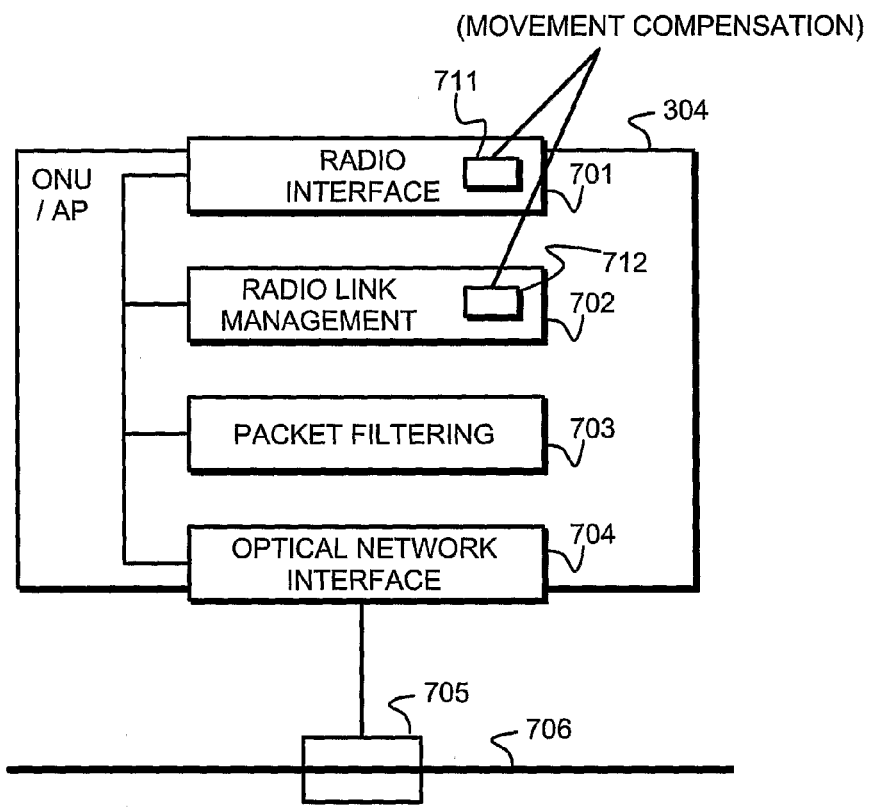
FIG. 7 illustrates schematically an optical network unit and access point in a communications system according to an embodiment of the invention.

FIG. 7 illustrates schematically certain parts of an ONU/AP 304. A radio interface 701 serves to enable wireless communication between the ONU/AP 304 and mobile routers that pass by in moving vehicles. A radio link management entity 702, which here is shown separately although it can also be seen to constitute a part of the radio interface 701, is responsible for performing operations that aim at setting up and maintaining radio connections with optimised capacity and throughput. A packet filtering entity 703 monitors all incoming packets and selects only appropriate ones thereof for further transmission. An optical network interface 704 is the interface through which the ONU/AP will communicate with other fixed devices in the network. The physical means for such communication comprise an optical coupler 705 and an optical fibre (or a small number of optical fibres) 706.

We may discuss certain aspects of the radio interface between an ONU/AP 304 and a mobile router 302 in more detail, especially in the framework of railway applications. Assuming that the mobile router 302 is in a railway carriage and the ONU/AP 304 stands at the trackside, the relative speed therebetween can be anything between zero and over 300 kilometers per hour. The Doppler shift in the radio frequency is significant. At least two kinds of corrective measures are available: fine tuning transmission frequency and/or timing in order to counteract the Doppler shift, or selecting packet size to be inversely proportional to the magnitude of the Doppler shift (the more Doppler shift, the smaller packets).

Figure 8A:
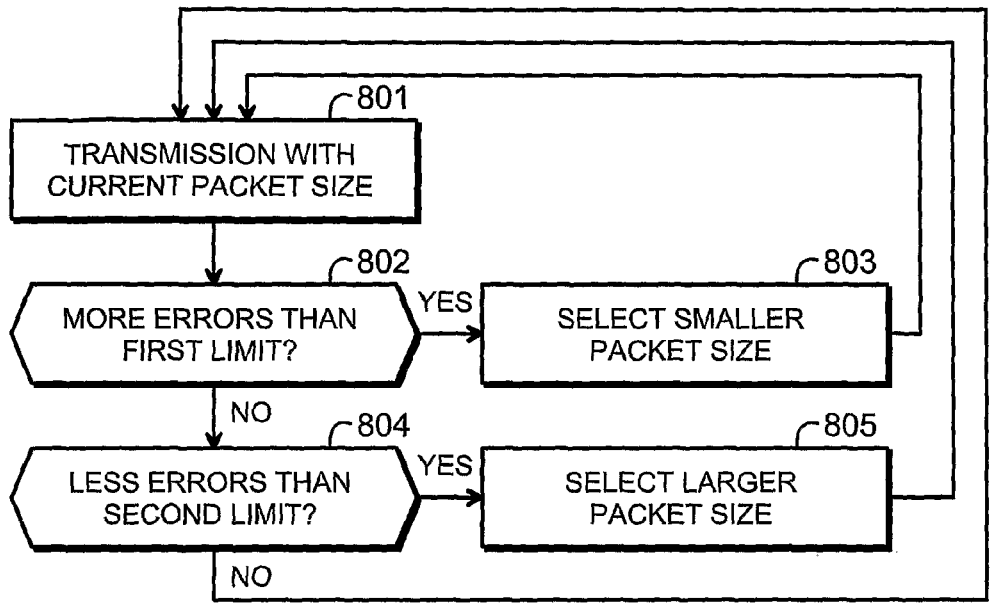
FIGS. 8a and 8b illustrate schematically certain control principles in a communications system according to an embodiment of the invention.

Both frequency correction and packet size selection can be made dynamically using transmission quality measurements as feedback to a control algorithm. FIG. 8a illustrates schematically dynamic packet size selection. During a transmission state 801 transmission quality is measured; the measurement may comprise e.g. monitoring a bit error ratio, a frame error ratio or some other feature that is known to reflect the success of using calculated channel estimates in a receiver. If there are, according to step 802, more errors per an amount of transmitted data than a first limit or threshold value, packet size is made smaller according to step 803. If there are, according to step 804, less errors per an amount of transmitted data than a second limit or threshold value, packet size is made larger according to step 805. Dynamic frequency correction algorithms are well known in the art and need not be described here further. Frequency correction and packet size selection of this kind can be equally performed in both a moving transceiver and a fixed transceiver.

A feature of the railway application of the invention is that it is very easy to obtain exact knowledge about the relative speed between a moving transceiver and a fixed transceiver. All modern trains include means for producing and distributing information about a measured speed of the train in electronic form and in real time. Even if there would be no access to the inherently existing speedometer arrangement, or in addition thereto, a mobile router could be equipped with a GPS extension or a similar locating device from which the speed information is readily available. A fixed transceiver at the trackside can receive the real time speed information from a passing train through signalling, or it can utilize an embedded speed radar, sensors placed under the track, or a comparable measuring arrangement of its own.

Figure 8B:
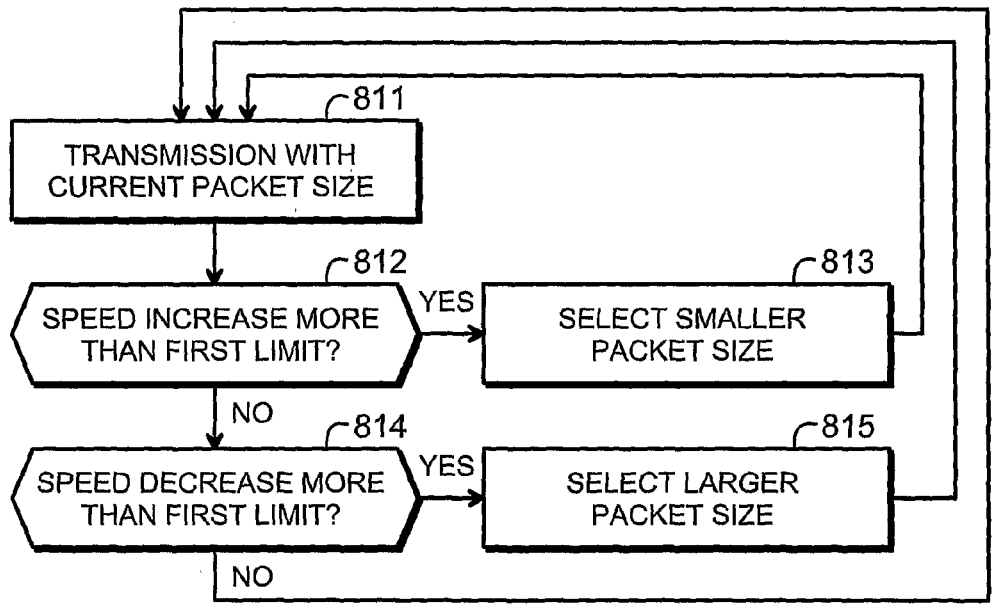

FIG. 8b illustrates an exemplary case of utilising speed information for selecting packet size. During a transmission state 811 speed information is obtained. If, according to step 812, the speed increases more than a first limit or threshold value, packet size is made smaller according to step 813. If, according to step 814, the speed decreases more than a second limit or threshold value, packet size is made larger according to step 815. Since speed information is easily available both for the mobile router and the ONU/AP, similar control algorithms may be applied in both of them. Dynamic frequency correction can be implemented in a very similar manner.

Frequency correction and packet size selection are both implemented in a movement compensation unit, examples of which have been illustrated as 409 in FIG. 4 as well as 711 and 712 in FIG. 7. A physical implementation of such control procedures typically involves a control processor that has input connections to receive the required transmission quality and/or speed information, and output connections to a tunable transmission frequency generator and/or to a baseband signal processing block that constructs the packets and thereby decides their size. A yet further possible way of utilising such a control arrangement in railway applications is to rely on the remarkable regularity in the speed of passing trains. For each trackside ONU/AP there is a default speed at which a train will pass. Such a default speed can even be regularly updated on the basis of measurements or information received from a railway traffic control centre. Each ONU/AP may apply an individually selected default value for frequency correction and/or packet size already to start with, which default value has been selected to match the default speed of a passing train. Within the train, a mobile router might assume that the speed of the train will always obey a certain time schedule, and select a default value for frequency correction and/or packet size according to the time passed since the train started moving, without having actual knowledge of speed in real time.

Figure 9:
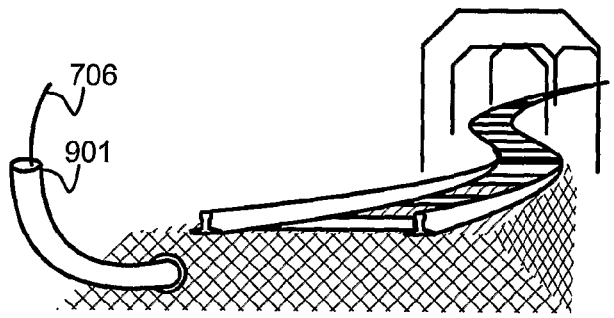
FIG. 9 illustrates the use of a small part of a long-distance fibre optic cable.

The connection between ONU/APs and OLTs deserves certain consideration. As the names of these devices suggest, and as FIG. 7 already illustrated, this connection goes most advantageously through an optical fibre. In railway applications there are exceptionally good reasons for selecting optical fibre as the transmission medium. Firstly, optical fibre is practically insensitive against electrical interference from the high voltages and currents involved in electric locomotives. Secondly, according to FIG. 9, it has become customary for railway track operators to draw high-capacity optical cables 901 along the side of all railway tracks. These cables were originally meant to be used as long-distance trunk routes between cities. Because of the relative ease of laying down a cable during railway track construction and renovation, the cables are usually heavily overdimensioned and a large part of their transmission capacity thus remains unused. According to an embodiment of the present invention, a small part of the overall capacity of such long-distance cables could be taken into use within a "distributed domain", i.e. small ONU/APs that will be located at the trackside much closer to each other than the heavy-duty switching centres between which the trunk routes originally were built and meant for. Said small part is designated in FIG. 9 as the line 706, corresponding to similar use of the reference designator in FIG. 7. Separating one optical fibre 706 or a small number of optical fibres 706 from a continuous cable and building a branching connection (cf. optical coupler 705 in FIG. 7) thereto in order to couple a communicating device to said optical fibre or said small number of optical fibres is a technique known as such, so it does not need to be described here.

Figure 10:
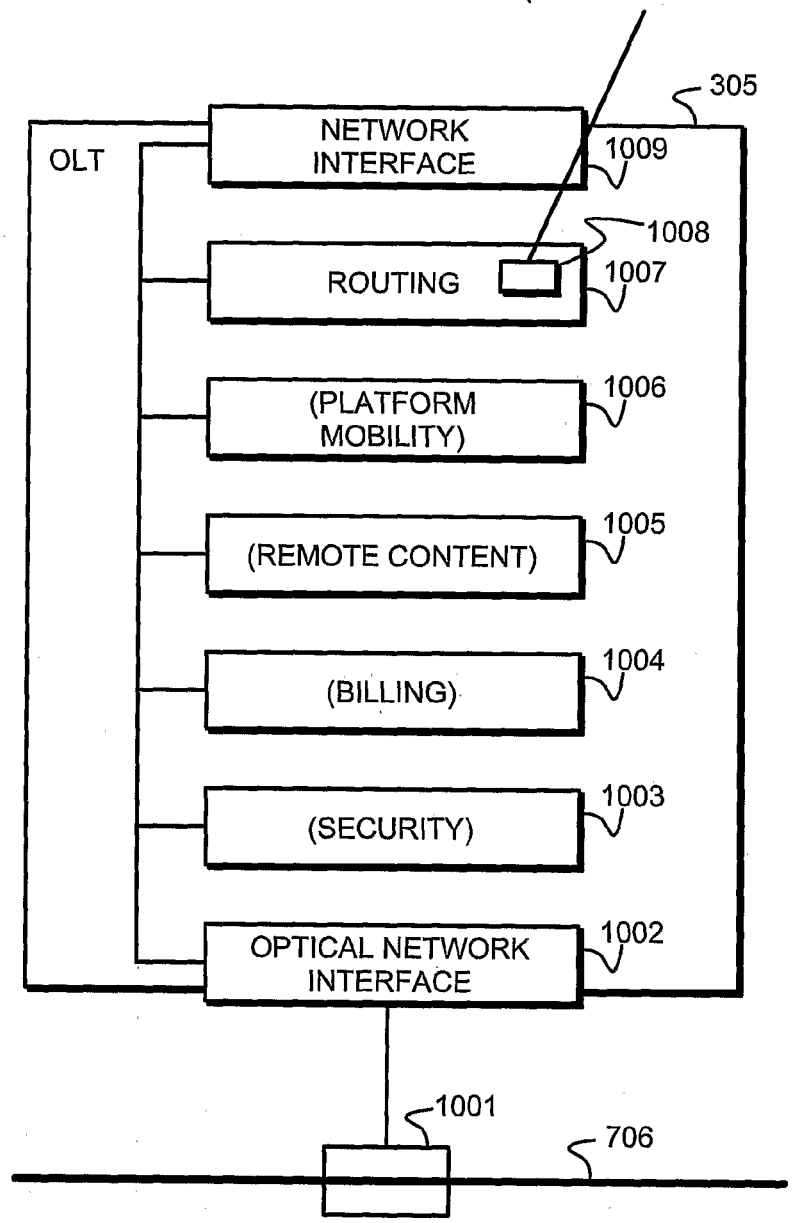
FIG. 10 illustrates schematically an optical line termination unit in a communications system according to an embodiment of the invention.

FIG. 10 illustrates schematically certain parts of an OLT 305. It is coupled to an optical fibre (or a small number of optical fibres) 706 through an optical coupler 1001 and an optical network interface 1002. The OLT 305 may comprise a security module 1003 that is responsible for security aspects, such as user authentication and cryptographic procedures. If the WLAN connection in moving vehicle is subject to charge and not all billing functionalities exist in the mobile routers and/or elsewhere in the network, some of them may reside in the OLT 305 in the form of a billing entity 1004. If the OLT 305 is to act as a content server for terminals that communicate with the mobile routers, there may be a content providing unit, which here is designated as the remote content entity 1005, because of its relatively distant location from the end users' terminals. In order to support mobility management of end users' terminals, there may be a platform mobility monitoring entity 1006 the task of which is to keep the OLT 305 up to date regarding the location and speed of vehicle platforms, such as railway carriages.

One of the main tasks of the OLT 305 is to act as a router, for which purpose there is a routing entity 1007, which has a mobility management part 1008 for taking care of functionalities related to the logical location of end users' terminals in the system. A network interface 1009 serves as means for connecting the OLT 305 to a packet-switched data network. The nature of this connection may vary, according to the network topology examples of FIGS. 11a, 11b and 11c.

Figure 11A:
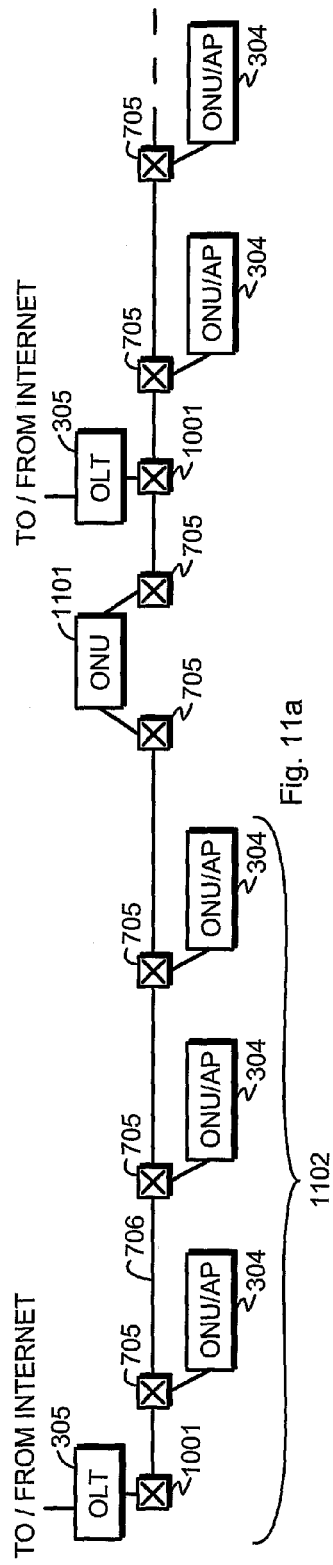
FIGS. 11a, 11b and 11c illustrate various network topologies in a communications system according to an embodiment of the invention.

FIG. 11a illustrates an exemplary network topology in which each OLT 305 administrates a group of ONU/APs 304, so that the ONU/APs 304 belonging to one group and the OLT 305 administrating them together constitute a subnetwork 1102. The connection from a subnetwork 1102 to an external packet-switched data network, such as the Internet or some proprietary data network, comes directly from the OLT 305. Each device that belongs to a subnetwork 1102 has a connection to an optical fibre 706. In FIG. 11a these connections go through optical couplers 705 and 1001 respectively. Consecutive subnetworks are linked together by a bridging ONU 1101, which here is shown as having a separate connection to each subnetwork. The task of the bridging ONU 1101 is to terminate each subnetwork, i.e. not let through packets that should only be distributed in one subnetwork, while simultaneously offering free passage for packets that represent communication between subnetworks. Although the bridging ONU 1101 is shown in FIG. 11a as being a different device than the ONU/APs 304, it is perfectly possible to make the last ONU/AP 304 of a subnetwork have bridging capability.

The number of ONU/APs in each group deserves some consideration. As a first assumption an OLT can handle something like 16 to 32 ONU/APs. On the other hand, such a first assumption is merely an analogy of building an office type network where it is very well possible that each ONU/AP is actively communicating with end users' terminals simultaneously. Again thinking about the railway example, it should be noted that trains will not follow each other immediately on a railway track, but there will always be an empty distance therebetween for the sake of safety. Assuming, as an example, that each train is 200 meters long (thus fitting into a single cell) and there is a safety distance of at least 2 kilometers between successive trains, only something like one tenth of the ONU/APs can have active connections at a time. Even if the ONU/APs should serve trains going into opposite directions, only an average of one fifth of them will have active connections at any single instant of time. Therefore we may assume that the number of ONU/APs per group, operating under the administration of a single OLT, may be much higher than in any analogous office applications. On the other hand, in dimensioning the network it must also be noted that fluctuation in the amount of traffic experienced by an ONU/AP will be large: for the most of the time the ONU/AP may have no active connections at all, while every now and then it must serve all active end users' terminals in two full trains going into opposite directions and passing each other within a single cell.

Figure 11B:
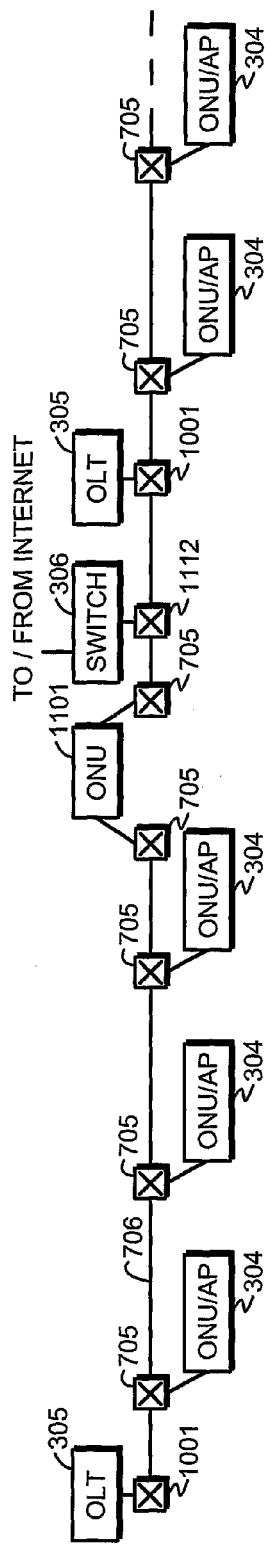
Figure 11C:
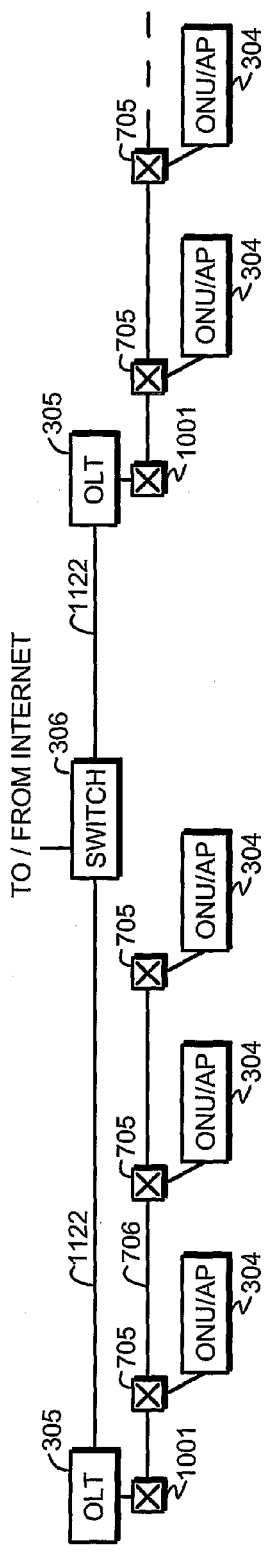

FIG. 11b illustrates another network topology, which is similar to that of FIG. 11a, except for the connections to an external packet-switched data network. These do not come from the OLTs 305 but from a switch 306, which has its own connection 1112 to the optical fibre that constitutes a backbone of one subnetwork. FIG. 11c illustrates a further alternative network topology, in which the subnetworks are not linked together by any bridging ONU; instead, there is a connection 1122 from each OLT 305 to a switch 306, from which comes the connection to an external packet-switched data network.

The network topologies of FIGS. 11a to 11c differ from each other from the view-point of mobility management. In the embodiments of FIGS. 11b and 11c the whole "train WLAN" is basically behind a single switch (although it may be wise to provide some reserve connection possibilities, in order to add redundancy and diminish a risk of a crucial single point failure). This means that once a mobile end user's terminal has become associated with the "train WLAN", its movements there from one cell to another and even from one subnetwork to another remain completely hidden from and irrelevant to any external network elements that are beyond the switch 1111 or 1121 respectively. All mobility management functions are limited to inside the "train WLAN": the switch must be aware of which subnetwork the end user's terminal is currently in; the OLT of that subnetwork must know the cell or cells in which the packets destined to a particular end user's terminal should be transmitted through the air; and naturally a mobile router must known which end users' terminals it is communicating with. It must be possible to take the end user's terminal from one railway carriage to another and still have the network connection operating, indicating the need for a handover mechanism between mobile routers.

On the other hand, if the "train WLAN" consists of a number of separate subnetworks like in FIG. 11a, each time when a mobile router moves from one subnetwork to another, changes are necessary in the routing tables of some routing entities beyond the OLTs 305. A similar situation arises even with the configurations of FIGS. 11b and 11c, if there are "train WLANs" of different network operators available along a single journey, and changing on the fly from one of them to another is allowed. This will most probably be the case at least after large-scale deployment of "train WLAN" systems has been achieved, and/or in countries where a large number of railway operators each own their respective track sections and are willing to auction the WLAN rights to mutually competing telecommunication operators.

We may safely assume that even in the last-mentioned case a single subnetwork is extensive enough to allow tens of minutes, if not hours of operation even though the end user's terminal was continuously moving in the train. Known WLAN technologies exist for managing the mobility of moving network nodes in time scales that slow.

The known mechanisms of WLANs are, however, too slow to be used for managing the mobility of mobile routers and end users' terminals at the accuracy of ONU/AP or cell. Assuming that the distance between ONU/APs is about one kilometre—or even less in curved or otherwise difficult track sections—and that a train propagates at a speed of about 250 km/h, the time interval between cell changes is easily much less than 15 seconds. The predictable nature of all cell changes helps to keep all link layer negotiations at minimum, because many factors that in normal ad-hoc type WLANs must be negotiated are now known in advance and can be pre-configured. Mobility management inside the "train WLAN" according to the invention is illustrated in the following example.

Figure 12:
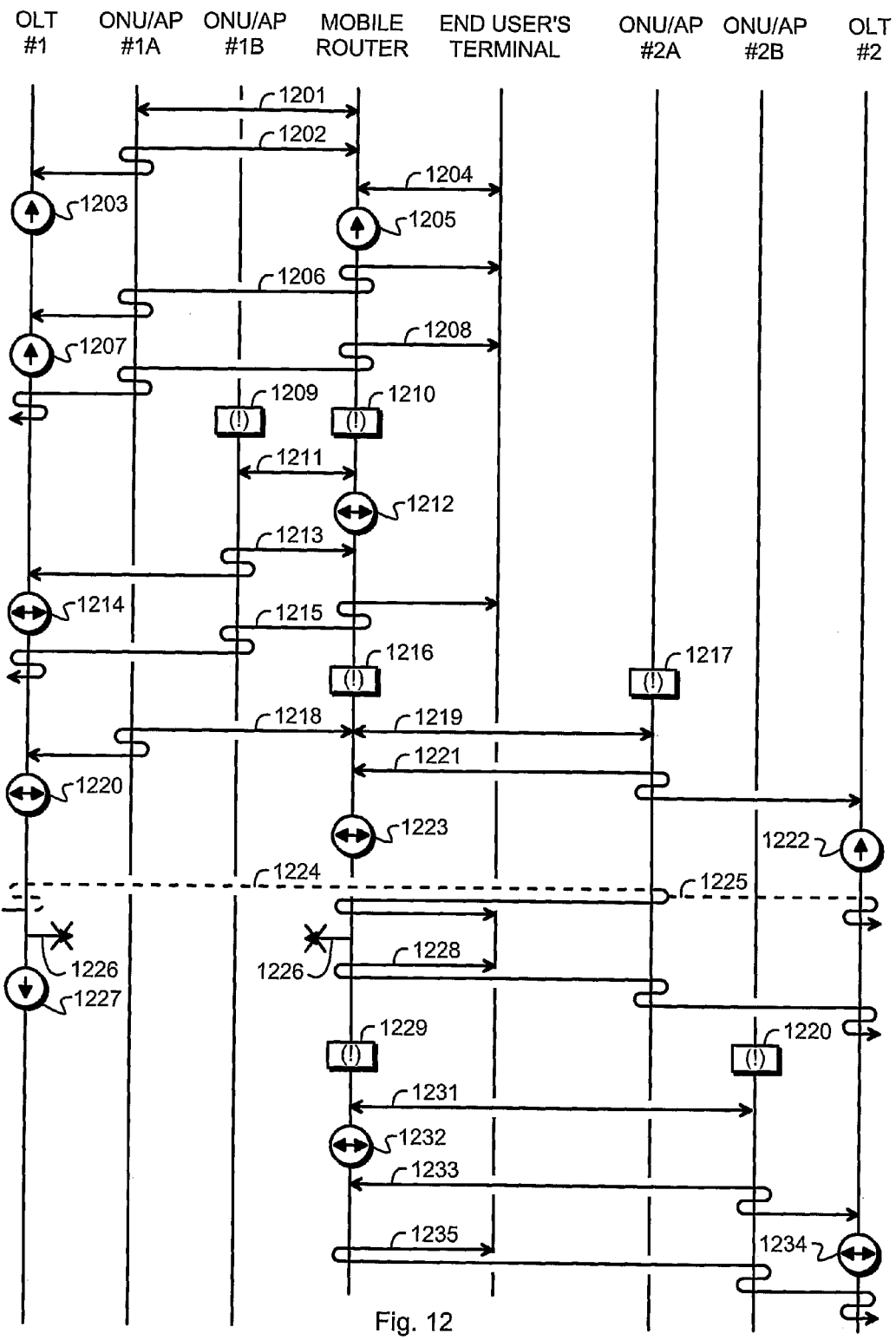
FIG. 12 illustrates schematically a method according to an embodiment of the invention.

FIG. 12 illustrates an exemplary chain of events when operating a network arrangement according to an embodiment of the invention. To properly bind the discussion to an easily comprehensible practical example, we may again assume that the predictably moving vehicle in question is a railway carriage. Operation begins when the carriage is standing on a station. At step 1201 a mobile router in the carriage sets up a radio connection with a first ONU/AP. When this connection is operative, the mobile router utilizes it at step 1202 to contact a first OLT, which thus becomes aware of the logical location of the mobile router within the network and sets a link to the mobile router into an "UP" state at step 1203.

At step 1204 an end user's terminal sets up a local wireless connection with the mobile router and performs the associated access control routines. Assuming that the end user can be properly authenticated and everything is in order for a connection to be set up, the mobile router updates its own routing table at step 1205, setting a link the end user's terminal into an "UP" state. At step 1206 the end user's terminal sends a message to the first OLT, which now becomes aware of the presence of the end user's terminal within the logical domain governed by the mobile router. In an alternative embodiment this message could come from the mobile router to the first OLT. The first OLT updates its routing table at step 1207 accordingly. After that the end user's terminal can begin communicating at step 1208 with any external network, so that the connection goes through the mobile router, the first ONU/AP and the OLT. The steps through which the end user's terminal becomes associated with the train WLAN typically involve also other signalling deeper into the general packet-switched data network in order to properly establish routing of all traffic to and from the end user's terminal. Such signalling and rerouting procedures can, however, be performed according to any general-purpose protocol such as the Mobile IP (Mobile Internet Protocol) and need not be discussed here in more detail.

The train starts moving, drawing the railway carriage towards the cell of a second ONU/AP. From the OLT, all downlink packets destined to the mobile router and the end users' terminals behind it are distributed to all ONU/APs in that particular subnetwork. However, not every ONU/AP is transmitting them wirelessly through the air, since the OLT has equipped these packets with a MAC (Media Access Control) address that the ONU/APs recognise. An ONU/AP will only transmit those downlink packets it receives from the OLT with a MAC address that matches that of the ONU/AP.

At steps 1209 and 1210, or at least at one of these steps, either the second ONU/AP or the mobile router or both become aware of the possibility of setting up a connection. The new connection is set up at step 1211. After the mobile router has rated the new connection as a better one than that to the first ONU/AP, it updates its routing table at step 1212 so that all connections go through the second ONU/AP. There follows at step 1213 a message from the mobile router to the OLT, to cause routing to be changed also at the OLT at step 1214. For a while, all communication between the end user's terminal and external networks goes through the mobile router, the second ONU/AP and the first OLT according to step 1215.

If means are provided for the OLT to know or deduce at least approximately the pace at which the mobile router is moving, it is possible to utilize the fact that the OLT will know for sure, which is the next ONU/AP that will make contact with the mobile router. The OLT may change the MAC addresses it puts on the downlink packets well ahead, so that also the next ONU/AP will receive and buffer packets even if it did not have a connection officially set up with the mobile router. If signalling information is available at the OLT about the movements of the mobile router, that can be used to time the moments of changing the MAC addresses. Even if no signalling information is available, it is possible to present a simple embodiment where the OLT will always tell both the known current ONU/AP and the immediately adjacent ONU/AP in the direction of movement to receive all downlink packets.

As the train moves further, the mobile router begins to approach a limit where the next ONU/AP belongs to the domain of a different OLT. In FIG. 12 the initiation for connection setup between the mobile router and a third ONU/AP comes from either at step 1216 or at step 1217 or both. In order to facilitate smooth inter-OLT handover, it is important that the old OLT becomes aware of the approaching need for performing one as early as possible. In FIG. 12 the mobile router sends signalling information to inform the old OLT at step 1218. Simultaneously the mobile router begins setting up a connection with the third ONU/AP at step 1219. The signalling message to the old OLT caused it to update a routing table at step 1220—how, will be discussed in more detail later. After the connection to the third ONU/AP is operative, the mobile router utilizes it to announce itself to the new OLT at step 1221. Said new OLT sets links to the mobile router to "UP" state at step 1222. The mobile router changes in its own routing table the new OLT to be the default OLT at step 1223.

The change in the routing table of the old OLT at step 1220 is most advantageously such that the old OLT will start tunnelling downlink packets to the next ONU/AP (the third ONU/AP in this example) despite of the fact that the next ONU/AP actually belongs to the subnetwork governed by a different OLT. What kind of a logical or physical connection is used for such inter-subnetwork tunnelling is not important to the present invention. Tunnelling the downlink packets across the subnetwork border helps to avoid delays and loss of data during the inter-OLT handover. For a short while there may occur a situation where downlink packets come from the old OLT, even if they come through the third ONU/AP, according to step 1224—while uplink packets go through the third ONU/AP and further through the new OLT according to step 1225.

Eventually the connection between the mobile router and all parts of the old subnetwork die out, which is illustrated in FIG. 12 as step 1226. In the old OLT this causes the link to the mobile router to be set into a "DOWN" state according to step 1227. Preferably the router or switch that had been providing downlink packets to the old OLT has a preconfigured optional route to the adjacent, new OLT, so setting the link down at step 1227 causes such an optional route to become the default route. At this time all communication between the end user's terminal and external networks go through the mobile router, the third ONU/AP and the new OLT according to step 1228.

Steps 1229-1234 replicate what has been said above about an "intra-OLT handover" or a procedure where the mobile router moves from the cell of one ONU/AP to that of another ONU/AP, which ONU/APs both belong to the same subnetwork. Steps 1229-1234 are mere duplicates of steps 1209-1214 respectively. At step 1235 all communication between the end user's terminal and external networks go through the mobile router, a fourth ONU/AP and the new OLT.

Figure 13:
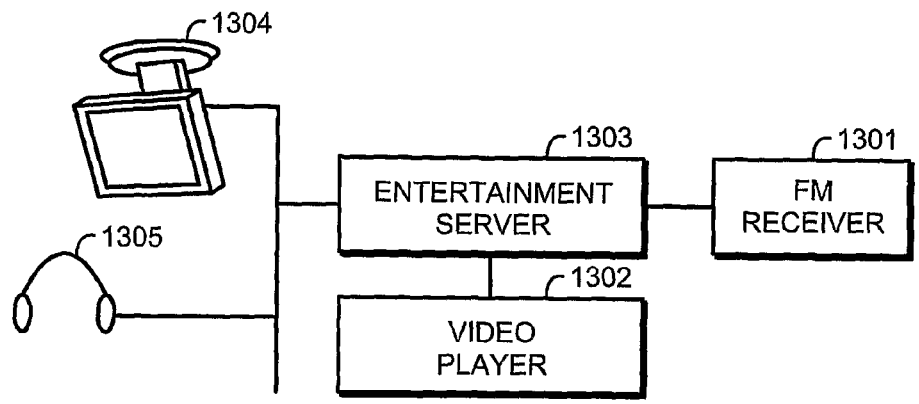
FIG. 13 illustrates a prior art vehicle network infrastructure.

Next we will describe certain possible uses of content that is distributed into a predictably moving vehicle through a network described in the foregoing. FIG. 13 illustrates a prior art train entertainment system, in which a video player 1302 and a car FM radio receiver 1301 act as content sources. The video player 1302 is an example of a local content source, while the FM receiver 1301 actually constitutes means for remotely receiving content that was produced somewhere else (at a radio station). Distribution of content from the local and remote content sources takes place through presentation apparatus, such as video screens 1304 and headphones 1305. The drawbacks of such a prior art arrangement are obvious: a local content source 1302 can only provide something that the train operator arranged there to be beforehand, such as a film from a previously purchased video cassette. The bandwidth of an FM radio receiver 1301 has only enabled accessing very limited amounts of remotely produced content, such as normal FM radio programs.

Figure 14:
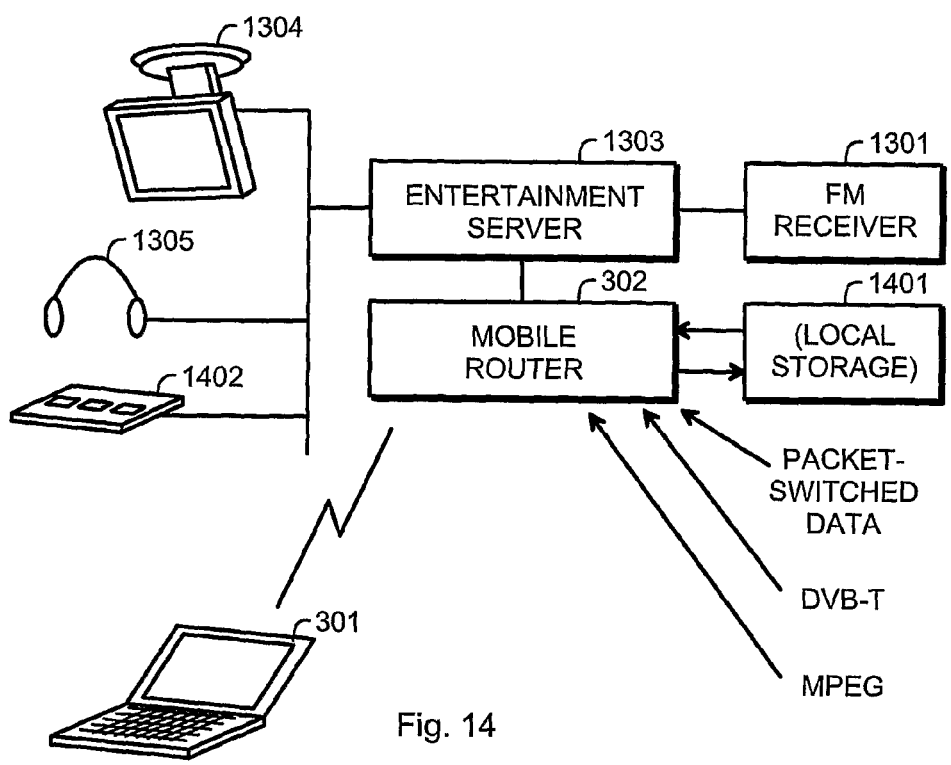
FIG. 14 illustrates a vehicle network infrastructure according to an embodiment of the invention and FIG. 15 illustrates exemplary use of a control panel in a network infrastructure according to FIG. 14.

FIG. 14 illustrates how the entertainment system of a vehicle can be greatly enhanced by taking a mobile router 302 as a content source. Here we assume that the mobile router 302 and the entertainment server 1303 are different devices, although these functionalities could be implemented also in a single computer. The mobile router 302 can act as a router and network node of a packet-switched data network, as has been described earlier. On the other hand, due to the large transmission capacity involved, it can also act as a receiver for DVB-T (Digital Video Broadcasting—Terrestrial) and/or MPEG (Motion Picture Experts Group) transmissions. If augmented with a large-scale local storage facility 1401, the mobile router 302 can store a number of digital broadcast streams coming into it online, and offer a number of end users the possibility of viewing the stored content at the pace they wish.

Figure 15:
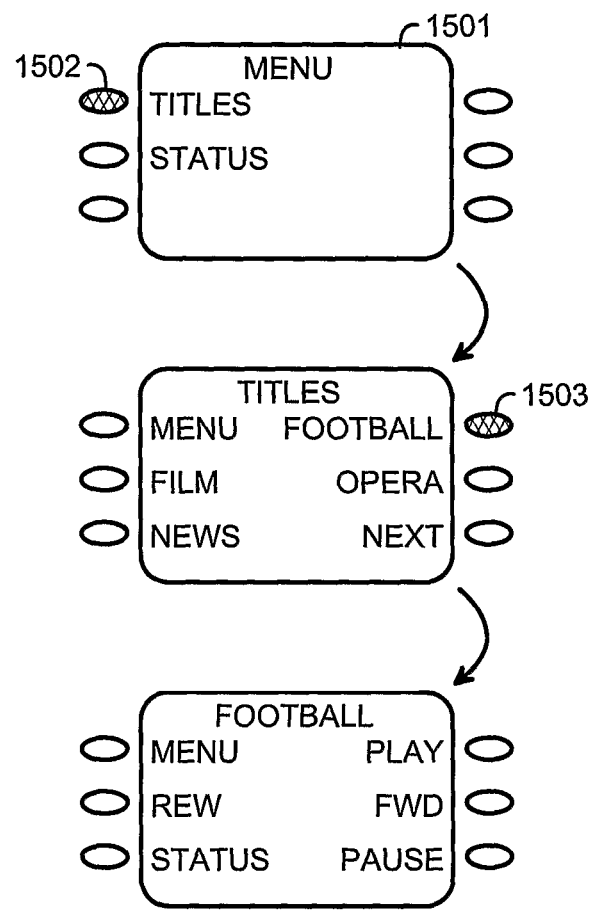

We may assume that the video screen 1304 is a personal video screen, so that each end user may make his own selection about the content to be viewed. As a part of the system of FIG. 14 there is a small control panel 1402 conveniently located near each seat, from which there is a upstream control channel connection to the entertainment server and optionally to the mobile router. FIG. 15 illustrates an exemplary sequence of using the control panel. A the topmost step a display 1501 in the control panel only contains two selections. An end user presses the top left button 1502, as illustrated by hatching, which causes titles to appear according to the middle step. Pressing now the top right button 1503 lets the end user view the latest football match, which the mobile router has received e.g. in DVB-T form and stored into a local storage facility. The end user can use the control buttons to start playing, to rewind, to forward and to pause, which operations all refer to ways in which the mobile router reads the stored contents from the storage facility and forwards it to the personal video screen of the end user.

As an alternative to distributing the received (and stored) content through the built-in presentation system 1304 and 1305 of the vehicle, the mobile router 302 could also forward it to the end user's own terminal 301 through the local WLAN connection.

The system of FIG. 14 enables many kinds of automated functionality. For example, the combination of the mobile router 302 and the entertainment server 1303 can be programmed to begin, end and alter the offering of entertainment and other content according to time, detected location, or any other similar triggering input. Most advantageously the system also has an input connection from a built-in announcement system of the vehicle, so that e.g. a railway guard can use the system to distribute announcements. It is easy to provide a programmable selection of e.g. whether ongoing content distribution should be paused for the duration of personnel-made announcements, or whether content distribution should be allowed to continue on the background.

Although the invention has been illustrated above with specific examples, the description so far should not be construed as excluding any alternative embodiments that would be evident to anyone of skill in the art. For example, although the description has almost exclusively revolved around railway applications, the invention is similarly applicable to road traffic. Especially outside the most central urban areas even the car of an individual driver proceeds along a relatively well-predicted route: drivers tend to cover long distances by driving along the most important trunk roads, and in each main intersection there is only a very limited number of possible new roads to take and consequently possible new cells to enter into. Between intersections the propagation of a car resembles very much the propagation of a train along a railway track. When the car is approaching a main intersection, the network may select the first cell along each possible new road into a group of predicted next cells. A bus will travel along an even more accurately predicted route than a private car, in which case applying the invention follows very similar procedures as in the railway applications.

A road-based WLAN can be though of as a "hot spot" extended to cover the whole length of a main road, or a number of main roads. As long as a car or a bus stays on those main roads, from the logical location viewpoint an end user's terminal within there is "within the road WLAN", and mobility management only needs to be performed within the closed road-based WLAN network much in the same way as in the railway example. If the car or bus takes a minor road (or if an end user steps out of the train and draws away from the cell of an ONU/AP covering the station), the end user's terminal goes out of the road-based WLAN network but can still communicate e.g. with a general cellular network, in which it typically has less bandwidth available. Thus, in the logical location sense a road-based WLAN or a railway WLAN constitutes an "island", in which the end user's terminal stays as long as it can communicate with any of the appropriate ONU/APs.

Another generalisation concerns the use of the optical fibre or a small number of optical fibres taken from a long-distance optical cable and utilised for connecting the ONU/APs to the OLTs. Although this is regarded as the most advantageous selection to be used in a vast majority of trackside ONU/APs, it is not reasonable to expect that each and every ONU/AP will only have a connection of this kind. For example at a large railway station it is possible that coverage requirements require placing dedicated ONU/APs so that their cells enclose e.g. the railway yard or the waiting room. If an OLT is also present at the station, it may be advantageous to draw a separate optical fibre from the OLT to the isolated ONU/AP, instead of trying to forcibly place the ONU/AP somewhere close to where the long-distance optical cable is lying.

The invention claimed is:

1. A wireless device comprising:
a mobile router configured to be located within a vehicle that has a predictable path of movement and configured to act as a hub of a wireless network on board the vehicle,
wherein the mobile router is configured to communicate with a fixed transceiver in a cell of which the mobile router resides during a predictable path of movement of the vehicle, and wherein the mobile router is equipped with routing capability,
wherein said mobile router is configured to implement routing of data packets between a packet-switched data network and at least one end user terminal operating in the wireless network on board the vehicle, and
wherein said mobile router is configured to perform a corrective measure in a radio connection between a transceiver of said mobile router and said fixed transceiver using a magnitude of a doppler shift of the radio connection and a determined speed at which the mobile router on board the vehicle is moving received from a speed determination unit, which corrective measure comprises dynamically selecting packet size based at least in part on the magnitude of the doppler shift, wherein a smaller packet size is selected when the magnitude of the doppler shift becomes larger and a larger packet size is selected when the magnitude of the doppler shift becomes smaller.

2. The wireless device according to claim 1, wherein as said speed determination unit, the mobile router comprises a positioning system receiver.

3. The wireless device according to claim 1, wherein as said speed determination unit, the mobile router comprises a connection from a train speedometer to said mobile router.

4. The wireless device according to claim 1, further comprising the mobile router configured to determine whether the speed at which the mobile router on board the vehicle is moving has increased more than a first limit threshold or decreased more than a second limit threshold,
wherein for a case the speed at which the mobile router is moving has increased more than the first limit threshold the selected packet size is made smaller, and
wherein for a case the speed at which the mobile router is moving has decreased more than the second limit threshold the selected packet size is made larger.

5. A method comprising:
establishing a wireless network around a mobile router on board a vehicle that has a predictable path of movement,
setting up a radio connection between a transceiver of the mobile router and one of a number of fixed transceivers, each of which has a geographical coverage area that constitutes a cell,
utilizing said radio connection to transfer data packets between the mobile router on board the vehicle and an external packet-switched data network,
maintaining routing tables at said mobile router on board the vehicle, in order to route data packets between the packet-switched data network and an end user's terminal operative in the wireless network on board the vehicle,
determining a speed at which the mobile router on board the vehicle is moving relative to a fixed transceiver, and
performing a corrective measure in said radio connection on a basis of a magnitude of a doppler shift of the radio connection and the determined speed, which corrective measure comprises dynamically selecting packet size based at least in part on the magnitude of the doppler shift, wherein a smaller packet size is selected when the magnitude of the doppler shift becomes larger and a larger packet size is selected when the magnitude of the doppler shift becomes smaller.

6. The method according to claim 5, wherein the method further comprises:
enabling continuous connections between the mobile router on board the vehicle and the external packet-switched data network by directing downlink packets to a fixed transceiver with which the mobile router on board the vehicle is communicating, and additionally to another fixed transceiver, which is that fixed transceiver with which the mobile router on board the vehicle will be communicating next with a highest probability based at least on the predictable path of movement.

7. The method according to claim 5, wherein the determining comprises determining based at least on the predictable path of movement that the vehicle is moving from a cell of a fixed transceiver of a first subnetwork to a cell of an adjacent fixed transceiver belonging to a second subnetwork;
the method comprises tunnelling downlink data packets destined to the mobile router on board the vehicle from said first subnetwork to said second subnetwork for further transmission from said adjacent fixed transceiver belonging to said second subnetwork to the mobile router on board the vehicle.

8. The method according to claim 5, further comprising determining whether the speed at which the mobile router on board the vehicle is moving has increased more than a first limit threshold or decreased more than a second limit threshold,
wherein for a case the speed at which the mobile router is moving has increased more than the first limit threshold the selected packet size is made smaller, and
wherein for a case the speed at which the mobile router is moving has decreased more than the second limit threshold the selected packet size is made larger.

9. Apparatus comprising:
a control processor configured to cause said apparatus at least to:
establish a wireless network around a mobile router on board a vehicle that has a predictable path of movement;
set up a radio connection between a transceiver of the mobile router and one of a number of fixed transceivers, each of which has a geographical coverage area that constitutes a cell;
utilize said radio connection to transfer data packets between the mobile router on board the vehicle and an external packet-switched data network;
maintain routing tables at said mobile router on board the vehicle, in order to route data packets between the packet-switched data network and an end user's terminal operative in the wireless network on board the vehicle;
determine a speed at which the mobile router on board the vehicle is moving relative to a fixed transceiver; and
perform a corrective measure in said radio connection on a basis of a magnitude of a doppler shift of the radio connection and the determined speed, which corrective measure comprises dynamically selecting packet size based at least in part on the magnitude of the doppler shift, wherein a smaller packet size is selected when the magnitude of the doppler shift becomes larger and a larger packet size is selected when the magnitude of the doppler shift becomes smaller.

10. The apparatus according to claim 9, further comprising the control processor configured to cause the apparatus to determine whether the speed at which the mobile router on board the vehicle is moving has increased more than a first limit threshold or decreased more than a second limit threshold,
- wherein for a case the speed at which the mobile router is moving has increased more than the first limit threshold the selected packet size is made smaller, and
- wherein for a case the speed at which the mobile router is moving has decreased more than the second limit threshold the selected packet size is made larger.

* * * * *